US011101893B2

United States Patent
Chan

(10) Patent No.: US 11,101,893 B2
(45) Date of Patent: Aug. 24, 2021

(54) OPTICAL CRYPTOGRAPHY FOR HIGH SPEED COHERENT SYSTEMS

(71) Applicant: Massachusetts Institute of Technology, Cambridge, MA (US)

(72) Inventor: Vincent W. S. Chan, Lincoln, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 937 days.

(21) Appl. No.: 15/196,933

(22) Filed: Jun. 29, 2016

(65) Prior Publication Data

US 2017/0005789 A1    Jan. 5, 2017

Related U.S. Application Data

(60) Provisional application No. 62/186,769, filed on Jun. 30, 2015.

(51) Int. Cl.
| | |
|---|---|
| H04L 9/06 | (2006.01) |
| H04B 10/61 | (2013.01) |
| H04B 10/27 | (2013.01) |
| H04B 10/50 | (2013.01) |
| H04B 10/85 | (2013.01) |

(52) U.S. Cl.
CPC ............ H04B 10/61 (2013.01); H04B 10/27 (2013.01); H04B 10/50 (2013.01); H04B 10/85 (2013.01); H04L 9/0656 (2013.01)

(58) Field of Classification Search
CPC ...... H04B 10/61; H04B 10/677; H04B 10/91; H04B 10/25
See application file for complete search history.

(56) References Cited

U.S. PATENT DOCUMENTS

| 5,678,648 A * | 10/1997 | Imanishi ............... B60K 11/08 180/68.1 |
| 7,831,049 B1 | 11/2010 | Kanter .......................... 380/256 |
| 2005/0135620 A1* | 6/2005 | Kastella ............... H04L 9/0858 380/256 |
| 2006/0018475 A1* | 1/2006 | Vig ....................... H04L 9/0852 380/256 |
| 2007/0133798 A1* | 6/2007 | Elliott ................... H04B 10/70 380/255 |
| 2007/0196109 A1 | 8/2007 | Al-Chalabi ................... 398/140 |

(Continued)

OTHER PUBLICATIONS

Scarani et al., The security of practical quantum key distribution, Jul.-Sep. 2009 The American Physcial Society, pp. 1301-1350.*

(Continued)

*Primary Examiner* — Ellen Tran
(74) *Attorney, Agent, or Firm* — Sunstein LLP

(57) ABSTRACT

A pseudo-random cipher stream is used to band-spread an optical carrier signal with coded data. A legitimate receiver uses an agreed-upon key to modulate its local oscillator and a resulting beat signal uncovers the band-spread signal. An eavesdropper who does not have the key finds the spread signal with too low signal-to-noise ratio to perform any useful determination of the message sequence. Theoretical bounds based on Shannon's Theory of Secrecy are used to show strength of the encoding scheme and predict it to be superior to the prior art.

23 Claims, 11 Drawing Sheets

(56) References Cited

U.S. PATENT DOCUMENTS

| | | | |
|---|---|---|---|
| 2011/0173696 A1* | 7/2011 | Dynes | H04B 10/70 |
| | | | 726/22 |
| 2012/0063769 A1* | 3/2012 | Brodsky | H04B 10/70 |
| | | | 398/25 |
| 2012/0321318 A1 | 12/2012 | Xu et al. | 398/76 |
| 2012/0328100 A1 | 12/2012 | Hirota | 380/256 |
| 2014/0247942 A1 | 9/2014 | Tuttle | 380/270 |

OTHER PUBLICATIONS

Mason, et al., "Widely Tunable Sampled Grating DBR Laser with Integrated Electroabsorption Modulator," IEEE Photonics Technology Letters, vol. 11., No. 6, pp. 638-640, Jun. 1999.

Paschotta, "Optical Heterodyne Detection," https://www.rp-photonics.com/optical_heterodyne_detection.html, 6 pages, Apr. 2, 2015.

Paschotta, "Shot Noise," https://www.rp-photonics.com/shot_noise.html, 4 pages, Mar. 19, 2015.

Paschotta, "Standard Quantum Limit," https://www.rp-photonics.com/standard_quantum_limit.html, 2 pages, Mar. 13, 2015.

Korean Intellectual Property Office, International Search Report, International Application No. PCT/US2016/040100, together with the Written Opinion of the International Searching Authority, 15 pages, Oct. 10, 2016.

* cited by examiner

OPTICAL CRYPTOGRAPHY FOR HIGH SPEED COHERENT SYSTEMS

CROSS-REFERENCE TO RELATED APPLICATIONS

This application claims the benefit of U.S. Provisional Patent Application No. 62/186,769, filed Jun. 30, 2015, titled "Optical Cryptography for High Speed Coherent Systems," the entire contents of which are hereby incorporated by reference herein, for all purposes.

TECHNICAL FIELD

The present invention relates to optical network security and, more particularly, to systems and methods for encrypting and decrypting optical signals through band spreading coherent transmissions.

BACKGROUND ART

Security of optical communication systems is important to government and commercial users. If an eavesdropper can receive and decrypt an encrypted message, the eavesdropper may learn important government, such as military, information or valuable confidential commercial information.

Stream cipher-based cryptographic systems encrypt and decrypt messages using keys. However, stream ciphers are vulnerable to attack if a key is used more than once. An eavesdropper with sufficient computing power and sufficient eavesdropped encrypted traffic can analyze the traffic to break the encryption. High performance computing and cloud technology is advancing at a rapid pace, and key-generated stream ciphers will have reduced security.

SUMMARY OF EMBODIMENTS

An embodiment of the present invention provides an optical signal encryptor. The optical signal encryptor includes a first input port. The first port is configured to receive an encryption key signal. The optical signal encryptor also includes a pseudo-random cipher-stream generator that generates a pseudo-random cipher-stream according to the encryption key signal. The optical signal encryptor further includes a laser whose optical output is band-spread according to the pseudo-random cipher-stream to produce a band-spread optical signal.

The optical signal encryptor also includes a second input port. The second input port is configured to receive a data stream. A modulator modulates the band-spread optical signal according to the data stream.

The modulator may be integrated with the laser. The laser may be directly modulated to cause the band-spread. The laser may be directly modulated by varying bias current to the laser. The laser may be directly modulated by varying temperature of the laser. The modulator may include an electro-optical modulator. The modulator may include an electro-absorption modulator.

The laser optical output may be band-spread at least 50 GHz. The laser optical output may be band-spread at least 1 THz.

The optical signal encryptor may include a pseudo-random timeslot interleaver disposed between the second input port and the modulator. The timeslot interleaver may interleave at least portions of the data stream and provide a timeslot interleaved data stream to the modulator.

The modulator may produce a modulated band-spread optical signal. The optical signal encryptor may further include a noise generator coupled to introduce errors in the modulated band-spread optical signal.

Another embodiment of the present invention provides an optical signal decryptor. The optical signal decryptor includes a first input port. The first input port receives an encryption key signal. The optical signal decryptor also includes a pseudo-random cipher-stream generator that generates a pseudo-random cipher-stream according to the decryption key signal. The optical signal decryptor also includes a local optical oscillator modulated by the pseudo-random cipher-stream.

The optical signal decryptor further includes a second input port. The second input port receives an encrypted optical signal. The optical signal decryptor also includes an optical balanced mixer. One input of the optical balanced mixer is coupled to the local optical oscillator, and another input of the optical balanced mixer is coupled to the second input port.

A demodulator is coupled to an output of the optical balanced mixer.

The optical signal decryptor may also include a deinterleaver decoder coupled to an output of the demodulator.

The optical signal decryptor may also include a forward error corrector coupled to an output of the demodulator.

The demodulator may operate within 0.1 dB of a quantum limit of coherent detection of the demodulator. The demodulator may operate within 1 dB of the quantum limit of coherent detection of the demodulator. The demodulator may operate within 3 dB of the quantum limit of coherent detection of the demodulator.

Yet another embodiment of the present invention provides a method for encrypting an optical signal. The method includes generating a coherent optical signal. A pseudo-random cipher-stream is generated according to an encryption key. The coherent optical signal is band-spread according to the pseudo-random cipher-stream to generate a band-spread coherent optical signal.

The method also includes receiving a data stream. The band-spread coherent optical signal is modulated according to the data stream to generate a modulated optical signal. The modulated optical signal is transmitted.

Optionally, at least portions of the data stream is pseudo-random timeslot interleaved, thereby producing a timeslot interleaved data stream. Modulating the band-spreading coherent optical signal includes modulating the band-spreading coherent optical signal according to the timeslot interleaved data stream.

Optionally, errors may be deliberately introducing in the modulated optical signal.

An embodiment of the present invention provides a method for decrypting an encrypted optical signal. The method includes generating a pseudo-random cipher-stream according to an encryption key and generating a local optical signal. The local optical signal is modulated according to the pseudo-random cipher-stream.

The method also includes receiving an encrypted optical signal. The encrypted optical signal and the modulated local optical signal are mixed to produce a product optical signal. The product optical signal is demodulated, thereby producing a demodulated signal.

Optionally, the demodulated signal may be deinterleaved and/or forward error correcting.

BRIEF DESCRIPTION OF THE SEVERAL VIEWS OF THE DRAWING

The invention will be more fully understood by referring to the following Detailed Description of Specific Embodiments in conjunction with the Drawings, of which.

DETAILED DESCRIPTION OF SPECIFIC EMBODIMENTS

In accordance with embodiments of the present invention, methods and apparatus are disclosed for encrypting an optical signal and for decrypting an encrypted optical signal, such as for transmitting an encrypted message from a transmitter to a legitimate receiver. Using stream cipher encryption and operating the legitimate receiver near the quantum limit of coherent detection prevents an eavesdropper performing any useful determination of the encrypted message.

Figure 1:
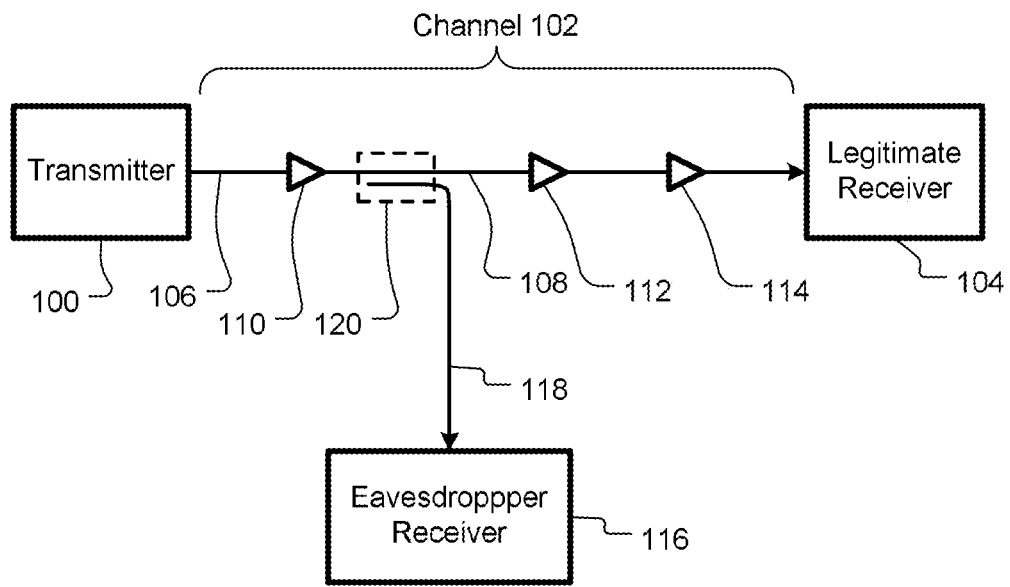
FIG. 1 is schematic block diagram of an optical communication system, according to the prior art.

FIG. 1 is schematic block diagram of a conventional optical communication system. A transmitter 100 transmits an optical communication signal along an optical channel 102 to a legitimate receiver 104. The transmitter 100 modulates the optical communication signal to convey messages, as is well known in the art. The optical channel 102 includes one or more optical fibers, exemplified by optical fibers 106 and 108, or free space. If the optical channel 102 includes optical fibers 106-108, the channel 102 may also include zero or more optical amplifiers, exemplified by optical amplifiers 110, 112 and 114. The optical amplifiers 110-114 may, for example, be erbium-doped fiber amplifiers (EDFAs). In addition, the channel 102 may include optical switches (not shown) used to implement an optical network. The legitimate receiver 104 receives the modulated optical communication signal and demodulates it to extract the messages, as is well known in the art.

An eavesdropper may optically couple an eavesdropper optical receiver 116 to the optical channel 102 via a rogue optical fiber 118 placed proximate or adjacent the optical fiber 108, so as to form an optical coupler 120. A portion of the optical signal in the channel 102 couples into the rogue optical fiber 118 and travels to the eavesdropper optical receiver 116. The eavesdropper receiver 116 may then attempt to receive messages sent by the transmitter 100 to the legitimate receiver 104. In some cases (not shown), the eavesdropper may generate counterfeit messages, i.e., messages that appear to have been transmitted by the transmitter 100, and transmit the counterfeit messages to the legitimate receiver 104, thereby creating confusion at the legitimate receiver 204 and possibly causing a denial of service.

The transmitter 100 and the legitimate receiver 104 may use a conventional cryptographic system in an effort to thwart the eavesdropper receiver 116 successfully receiving the messages. Cryptographic systems are generally characterized as using block ciphers or stream ciphers. A block cipher encrypts a group of plaintext symbols as one block and then sends the encrypted block. Each plaintext symbol consists of one or more bits. A plaintext symbol can, but need not, represent one character of a message. The encryption generally depends on a key and at most one previously encrypted block. The same key may be used to encrypt a series of blocks. An entire encrypted block must be received before the block can be decrypted.

A stream cipher encrypts one symbol of plaintext into one symbol of ciphertext. Thus, the ciphertext can be decrypted per symbol, without having to receive an entire block of ciphertext before beginning the decryption. A different key is used to encrypt each plaintext symbol, thus a stream of keys is needed. As with block ciphers, each plaintext symbol consists of one or more bits and may represent one character, less than one character or more than one character. However, as noted, conventional stream ciphers have limitations.

Embodiments of the present invention overcome the limitations of conventional stream cipher encryption schemes. In an embodiment of the present invention, a transmitter and a legitimate receiver use an agreed upon key to band-spread and de-band-spread, respectively, a coherent optical signal sent from the transmitter to the legitimate receiver. The legitimate receiver operates near its quantum limit of coherent detection. Thus, an eavesdropper who does not have the key cannot uncover the brand-spread signal correctly, and the signal has too low a signal-to-noise (S/N) ratio to permit any useful statistical determination of messages in the signal. The combination of stream cipher encryption and operation near the quantum limit of coherent detection is novel and not obvious.

Figure 2:
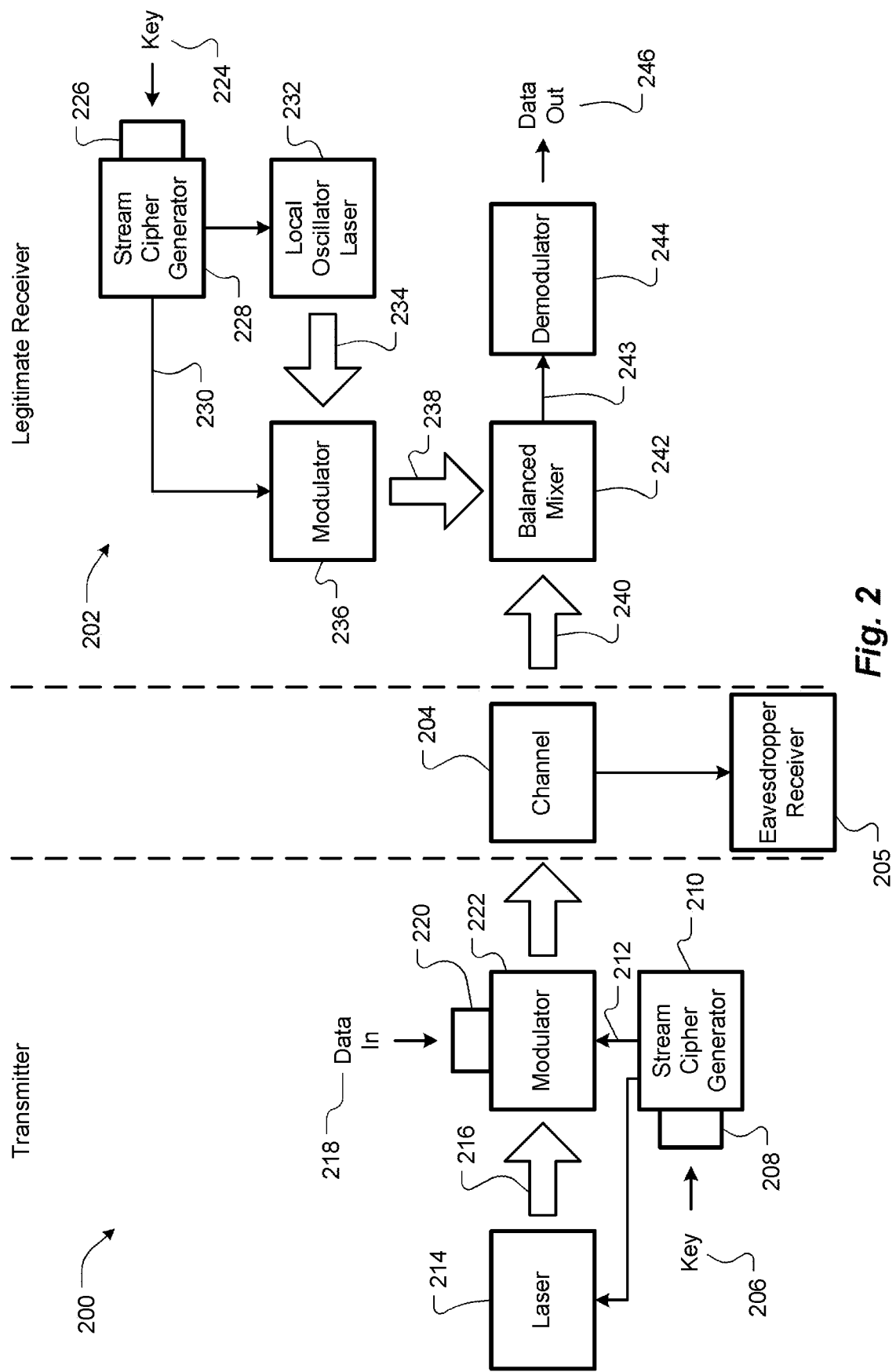
FIG. 2 is a schematic block diagram of an optical signal encryptor and an optical signal decryptor, according to embodiments of the present invention.

FIG. 2 is a high-level schematic block diagram of an optical signal encryptor (transmitter 200) and an optical signal decryptor (legitimate receiver 202), according to respective embodiments of the present invention. An optical channel 204 interconnects the transmitter 200 and the legitimate receiver 202. As in FIG. 1, the optical channel 204 includes one or more optical fibers and zero or more optical amplifiers (not shown) and zero or more optical switches (not shown), or free space. An eavesdropper receiver 205 may be present along the channel 204.

The transmitter 200 receives an encryption key signal 206 via a first port 208. The encryption key signal 206 may be a digital signal or an analog signal. A first pseudo-random cipher-stream generator 210 uses the encryption key signal 206 to generate a first pseudo-random cipher-stream 212 of keys. For example, the encryption key signal 206 may be used as a seed value for generating the first pseudo-random cipher-stream 212 of keys using a shift register. The keys may be digital signals or analog signals. The cipher-streams are generated relatively rapidly, such as about 100 Gbps (gigabits per second), although other rates, such as 10 Gbps that are not the same as the communication channel rate, may be used. Generally, the higher the bit rate, the more difficult it is for the eavesdropper to decipher messages. A laser 214 generates an optical signal 216, which is band-spread according to the pseudo-random cipher-stream 212 to create an optical carrier signal.

For example, the optical signal 216 may be phase modulated or frequency modulated according to the pseudo-random cipher-stream 212. That is, for each key in the pseudo-random cipher-stream 212, the optical signal 216 may be phase or frequency shifted by an amount that depends on the key. Typically, the shift amount equals the key's value multiplied by a deviation constant, although other modulation schemes may be used. Consequently, the instantaneous phase or frequency of the optical carrier signal changes rapidly, and these changes are unpredictable without the encryption key signal 206. Thus, the eavesdropper receiver 205, without the encryption key signal 206, cannot change its receive phase or frequency in synchrony with the rapidly and, to the eavesdropper, unpredictably changing phase or frequency of the optical carrier signal.

The phase or frequency modulation causes the optical carrier signal to have an instantaneous frequency that falls within a bandwidth centered on the frequency (wavelength) of the laser 214. The magnitude of the bandwidth depends on the range of key values in the pseudo-random cipher-stream 212 and on the peak deviation that is generated according to the deviation constant. In some embodiments, the speed of modulation is on the order of about 60 GHz for current state-of-the-art external modulators, although the maximum deviation can be less or much higher if, for example, direct current modulation of the laser 214 or 232 frequency is used. In some embodiments, the bandwidth can be on the order of about 1 THz or even higher. Thus, the band-spread optical carrier signal is a broadband optical signal. As used herein, a broadband optical signal means an optical signal having a bandwidth of at least about 50 GHz.

The transmitter 200 receives an input data stream 218 via a second port 220. A modulator 222 modulates the band-spread optical carrier signal according to the data stream 218, and the modulated optical carrier signal is sent over the channel 204 toward the legitimate receiver 202. The modulation according to the input data stream 218 may be phase or frequency modulation or another modulation scheme, not necessarily the same modulation scheme used to generate the band-spread optical carrier signal. However, in many embodiments, the same modulation scheme is used to modulate according to the input data stream 218 and to generate the band-spread optical carrier signal. It should be noted that the optical signal generated by the laser 214 is modulated according to the pseudo-random cipher-stream 212, producing the band-spread optical carrier signal, and the band-spread optical carrier signal is modulated according to the input data stream 218. The two modulation operations are shown combined and performed by a single modulator 222, although separate modulators (not shown) may be used. The keys 206 and 224 are synchronized, as in conventional cryptographic systems and as well known in the art, thus key synchronization is not shown here.

The legitimate receiver 202 receives a copy 224 of the encryption key signal 206 via a third port 226. A second pseudo-random cipher-stream generator 228 uses the copy 224 of the encryption key signal to generate a second pseudo-random cipher-stream 230. A local oscillator laser 232 generates an optical signal 234. A phase or frequency modulator 236 band-spreads the optical signal 234, according to the second pseudo-random cipher-stream 230, producing a band-spread optical signal 238, as described above, with respect to the transmitter 200. The band-spread optical signal 238 corresponds to the band-spread optical carrier signal generated in the transmitter 200. That is, the receiver's 202 band-spread optical signal 238 changes phase or frequency in lock step with, and by the same amount as, the transmitter's 200 optical carrier. Optionally, the band-spread optical signal 238 can be offset in phase or frequency from the transmitter's 200 band-spread optical carrier signal by a fixed amount.

The legitimate receiver 202 receives an input optical signal, via a fourth port 240, from the channel 204. An optical double balanced mixer 242 mixes the input optical signal with the band-spread optical signal 238 to produce a beat signal 243 by the well-known principle of heterodyning/homodyning. Alternatively, a simpler single detector (not shown) may be used instead of the double balanced optical mixer 242, although with some sacrifice in security. At any given point in time, the beat signal 243 has a frequency that is a difference (or sum) of the instantaneous frequency of the received optical signal (from the port 240) and the instantaneous frequency of the rapidly-changing band-spread optical signal 238. Thus, the beat signal 243 changes over time and thereby recovers the modulation imparted by the transmitter 200 on the optical carrier signal. Without the band-spread optical signal 238, whose phase or frequency changes with the phase or frequency of the transmitter's 200 optical carrier signal, the eavesdropper receiver 205 cannot recover this modulation. The eavesdropper receiver 205 would not be able to detect the band-spread signal within the bandwidth of its optical detector, because the bandspreading is beyond the output electrical bandwidth of the detector. The beat signal 243 can be at baseband or at some intermediate frequency (wavelength).

The beat signal 243 is then demodulated by a demodulator 244 to generate an output data stream 246, which corresponds to the input data stream 218 fed to the transmitter 200. Preferably, the demodulator 244 operates at or near the quantum limit of coherent detection. An optical detector (not shown) within the demodulator 244 operates at or near the quantum limit of coherent detection.

As a practical matter, noise is present in all receivers. The level of the noise is partly related to the physical phenomenon of quantum fluctuations within physical components of the receiver. This noise prevents the receiver ascertaining the state of an incoming optical signal with perfect accuracy. To be detectable, an incoming optical signal's level must be sufficiently high, relative to the noise level, so the receiver can distinguish the signal from the noise. This is commonly referred to as the quantum limit of coherent detection. As used herein, the term quantum limit of coherent detection has its common meaning, as used by those of skill in the art.

In some embodiments, the demodulator 244 operates within about 0.1 dB of the quantum limit of coherent detection. In some embodiments, the demodulator 244 operates within about 1 dB of the quantum limit of coherent detection. In some embodiments, the demodulator 244 operates within about 3 dB of the quantum limit of coherent detection.

As noted, the eavesdropper receiver 205 cannot directly recover the modulation of the optical carrier signal from the transmitter 200, because the optical carrier signal generated by the transmitter 200 rapidly varies in phase or frequency in a way that is not predictable without the key 224. Furthermore, the optical carrier signal generated by the transmitter 200 has a bandwidth greater than the bandwidth of any available optical detector. Thus, the eavesdropper receiver 205 cannot detect the entire bandwidth of the optical signal from the transmitter 200 with a single detector in an attempt to analyze the broadband modulated optical carrier signal transmitted by the transmitter 200.

As discussed in more detail herein, the eavesdropper may attempt to compensate for the inability to demodulate the entire broadband modulated optical carrier signal with a single detector by splitting the eavesdropped optical signal into several relatively narrow frequency (wavelength) bands and detecting each of these bands by a respective optical detector. However, each of these optical detectors introduces quantum noise, and the optical signal has insufficient signal-to-noise (S/N) ratio to permit any useful determination of messages in the signal.

Additional Exemplary Transmitters and Receivers

The transmitter 200 and the legitimate receiver 202 may be implemented using a variety of techniques, components and/or options, in various combinations. For example, in some embodiments, the lasers 214 and/or 232 are directly modulated, such as by modulating semiconductor bias current or temperature of the lasers 214 and/or 232. Some embodiments include optical modulators integrated with the semiconductor lasers 214 and/or 232. Some embodiments include optical modulators separate from the lasers 214 and/or 232. In some embodiments, the transmitter 200 uses a different mechanism to band-spread the optical signal from its laser 214 than the legitimate receiver 202 uses to band-spread the optical signal from its local oscillator laser 232.

Figure 3:
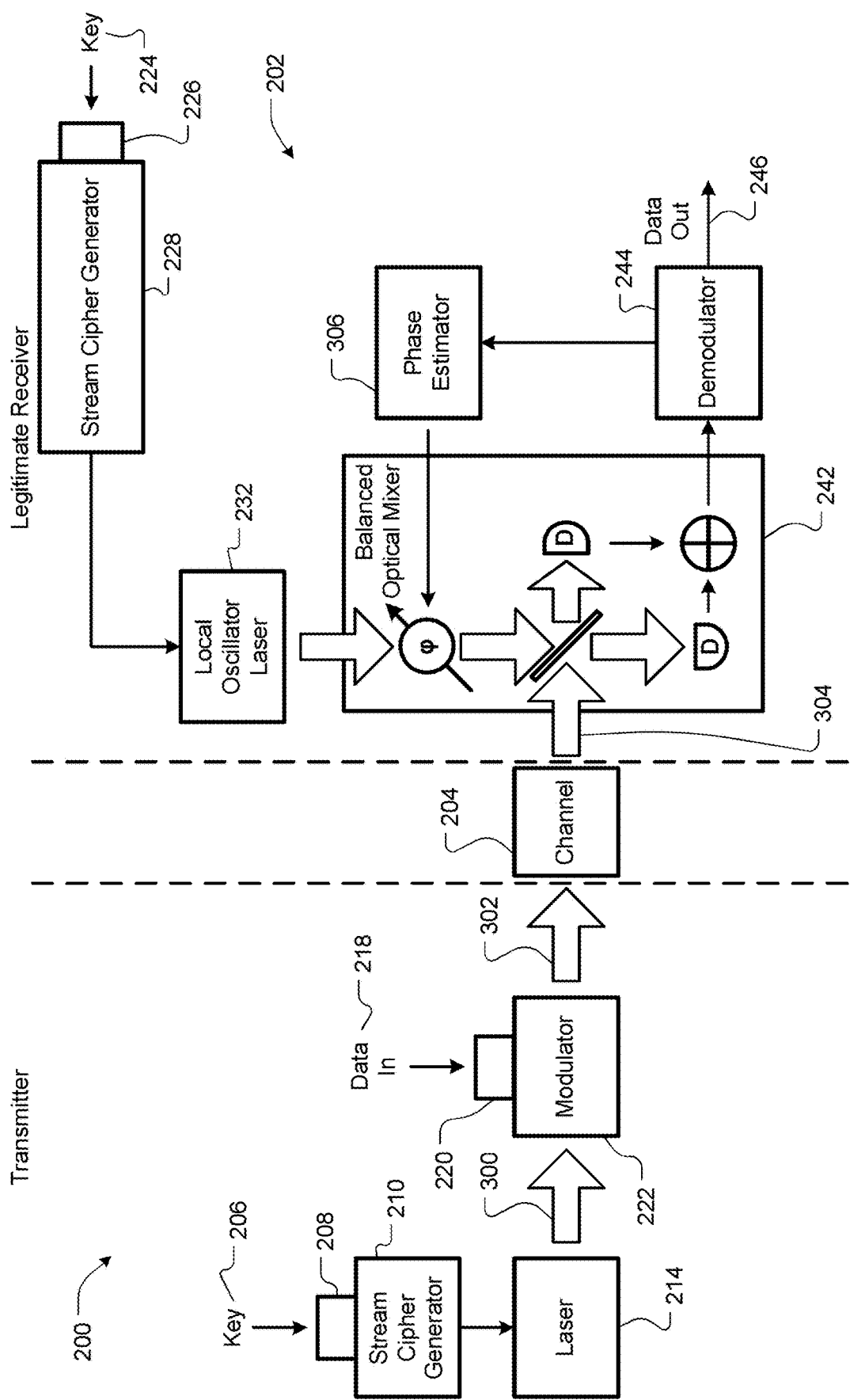
FIGS. 3-5 and 7 are schematic block diagrams of the optical signal encryptor and the optical signal decryptor of FIG. 2, according to respective alternative embodiments of the present invention.

FIG. 3 is a schematic block diagram of the optical signal encryptor (transmitter 200) and the optical signal decryptor (legitimate receiver 202) of FIG. 2, according to embodiments of the present invention. In the embodiments shown in FIG. 3, the lasers 214 and/or 232 are directly modulated, such as by modulating semiconductor bias current and/or temperature of the lasers 214 and/or 232, to achieve broadband spreading up to on the order of terahertz.

Alternatively, the lasers 214 and/or 232 may include modulators integrated with the semiconductor lasers 214 and/or 232. As used in this context, integrated means fabricated together during a semiconductor fabrication process. In one such embodiment, an electroabsorption modulator is integrated with the lasers 214 and/or 232 to achieve a bandwidth of about 60 GHz. Such a widely tunable semiconductor laser with an integrated electroabsorption modulator is described by K. Nakahara, et al., in "Direct Modulation at 56 and 60 Gb/s of 1.3-µ-m InGaAlAs Ridge-Shaped-BH DFB Lasers," IEEE Photonic Technology Letters, vol. 27, pp. 535-536, 2015, the entire contents of which are hereby incorporated by reference herein. Also see B. Mason, et al., "Widely tunable sampled grating DBR laser with integrated electroabsorption modulator," IEEE Photonics Technology Letters, vol. 11, issue 6, pp. 638-640, June 1999, the entire contents of which are hereby incorporated by reference herein.

The laser 214 generates a band-spread optical carrier signal 300, which is modulated by the modulator 222, according to the input data stream 218, as described with respect to FIG. 2. A modulated optical carrier signal 302 is sent into the channel 204.

The legitimate receiver 202 receives a modulated optical carrier signal 304 from the channel 204. The balanced optical mixer 242 mixes the received modulated optical carrier signal 304 with the output from the receiver 202's local oscillator laser 232, as described with respect to FIG. 2. The output from the balanced optical mixer 242 is demodulated by a demodulator 244 to generate the output data stream 246. An output from the key 224 drives a phase estimator 306, which provides a replica of the phase of the optical carrier signal to the balanced optical mixer 242, which in essence de-spreads the band spread signal in the mixing process during detection. In other respects, the transmitter 200 and the legitimate receiver 202 operate similarly to the transmitter 200 and the legitimate receiver 202, respectively, of FIG. 2.

Figure 4:
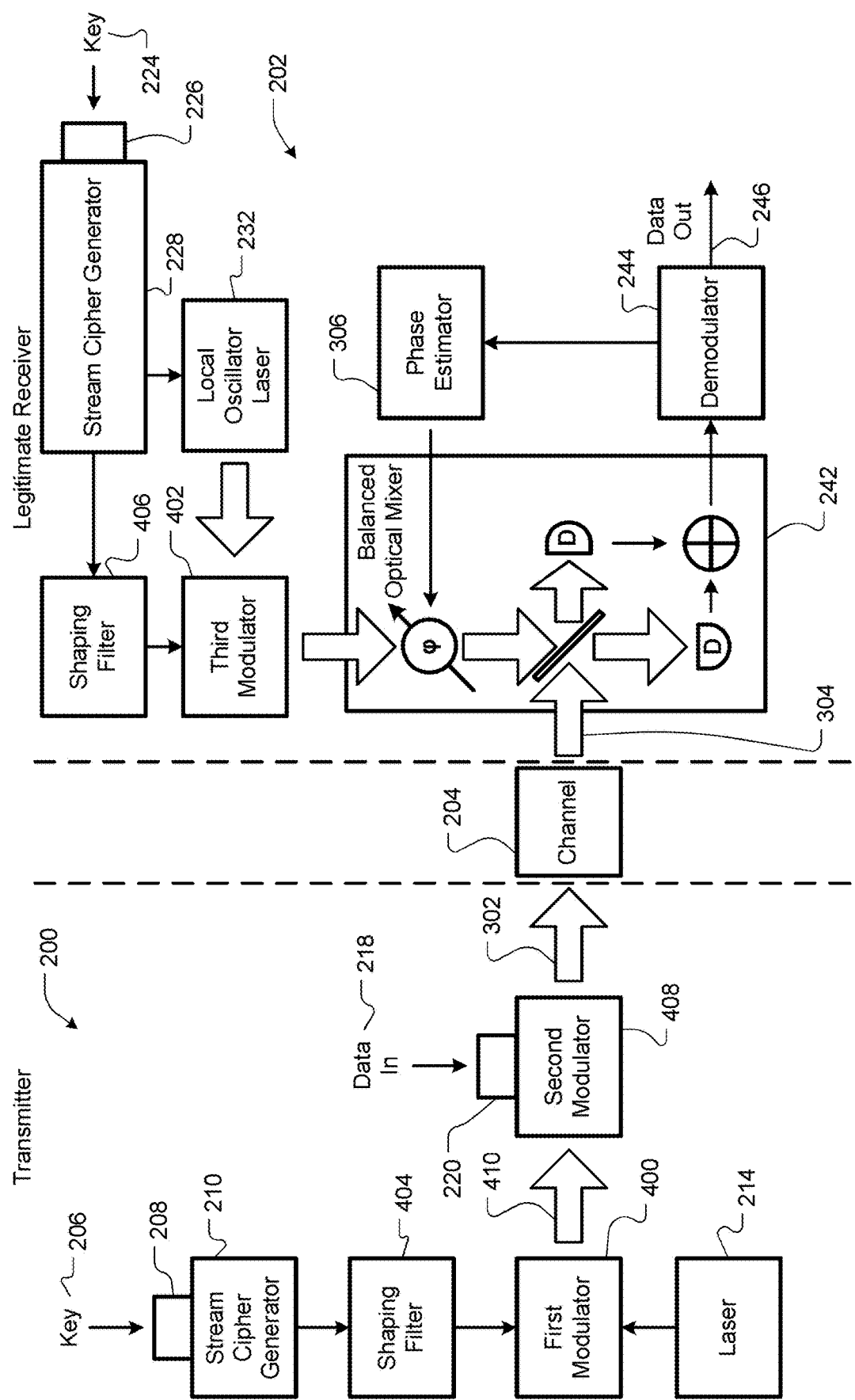

FIG. 4 is a schematic block diagram of the optical signal encryptor (transmitter 200) and the optical signal decryptor (legitimate receiver 202) of FIG. 2, according to other embodiments of the present invention. In the embodiments shown in FIG. 4, the lasers 214 and/or 232 are modulated by first and third modulators 400 and 402, respectively, that are external of the lasers 214 and/or 232.

The first and third modulators 400 and 402 may be electro-optic modulators (EOMs) or other types of external optical modulators. An EOM is an optical device in which a signal-controlled element exhibiting the electro-optic effect is used to modulate a beam of light. The electro-optic effect causes a change in the refractive index of a material, as a result of applying a DC or low-frequency electric field to the material. The modulation may be imposed on the phase, frequency, amplitude or polarization of the beam. Modulation bandwidths extending into the 100 GHz range are possible with the use of laser-controlled modulators. See, for example, "Electro-optic modulator" in Wikipedia.com, the entire contents of which are hereby incorporated by reference herein. Suitable hardware having rates on the order of 100 GHz are available from EOSPACE, Inc., Redmond, Wash.

The transmitter 200 and the legitimate receiver 202 include shaping filters 404 and 406 between the stream cipher generators 210 and 228 and the respective first and third modulators 400 and 402. A second modulator 408 modulates the broadband optical carrier signal 410 according to the input data stream 218, as in the embodiments of FIGS. 2 and 3. However, the order of the first modulator 400 and the second modulator 408 may be reversed. Other aspects of the transmitter 200 and the legitimate receiver 202 operate similarly to the transmitter 200 and the legitimate receiver 202, respectively, of FIGS. 2 and 3.

Figure 5:
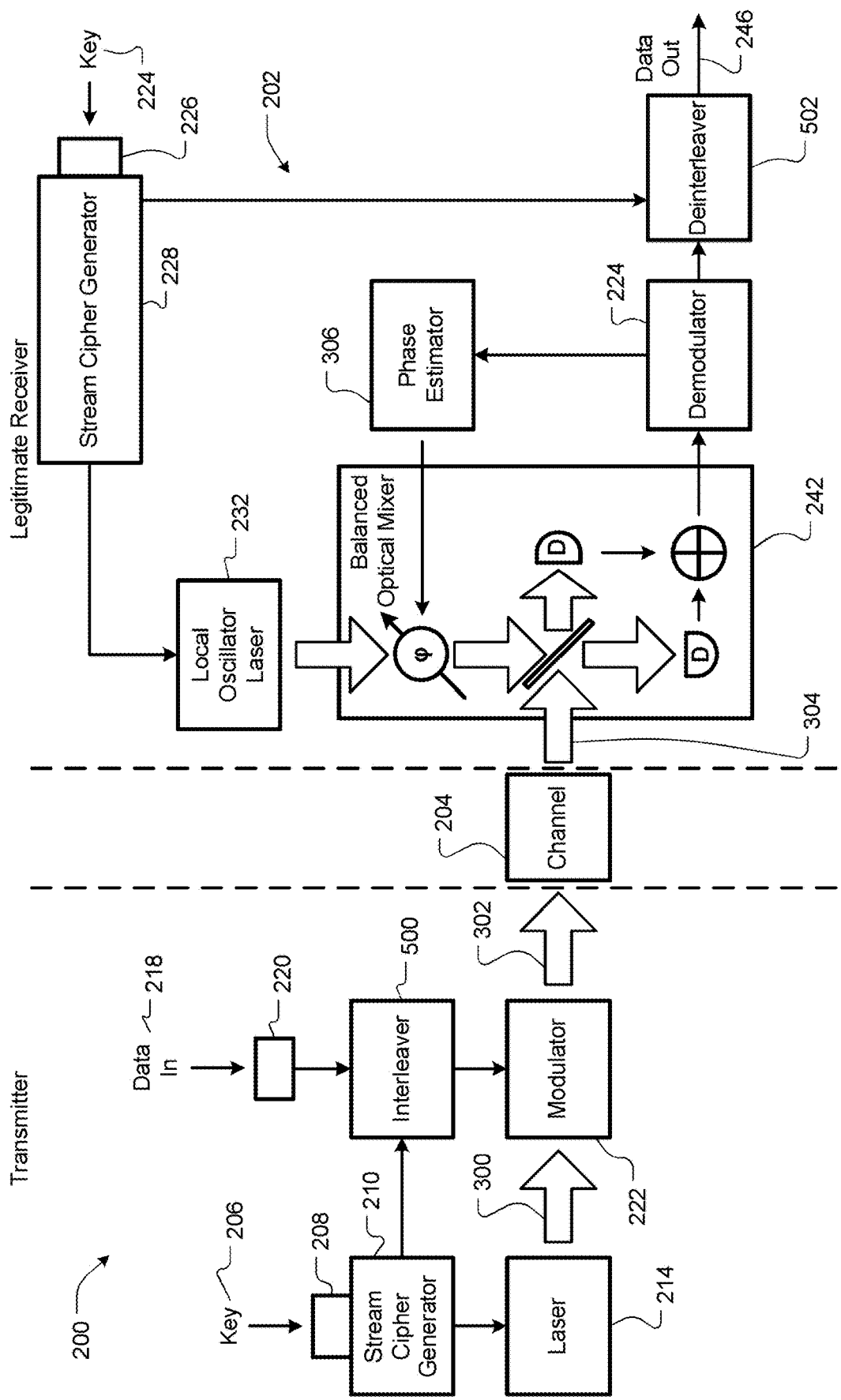

FIG. 5 is a schematic block diagram of the optical signal encryptor (transmitter 200) and the optical signal decryptor (legitimate receiver 202) of FIG. 3, according to other embodiments of the present invention. In the embodiments shown in FIG. 5, a pseudo-random timeslot interleaver 500 is interposed between the input data stream port 220 and the modulator 222, and a deinterleaver 502 is coupled to the output of the demodulator 224. The pseudo-random timeslot interleaver 500 and the deinterleaver 502 provide an additional layer of protection against an eavesdropper.

The pseudo-random timeslot interleaver 500 permutes plaintext symbols or portions of plaintext symbols before the modulator 222 modulates the broadband optical carrier signal with the (now permutated) symbols. The pseudo-random timeslot interleaver 500 is driven by the stream cipher generator 210. That is, keys generated by the stream cipher generator 210 are used to determine or select the permutations. The deinterleaver 502 operates in an opposite manner to reverse the permutations.

Figure 6:
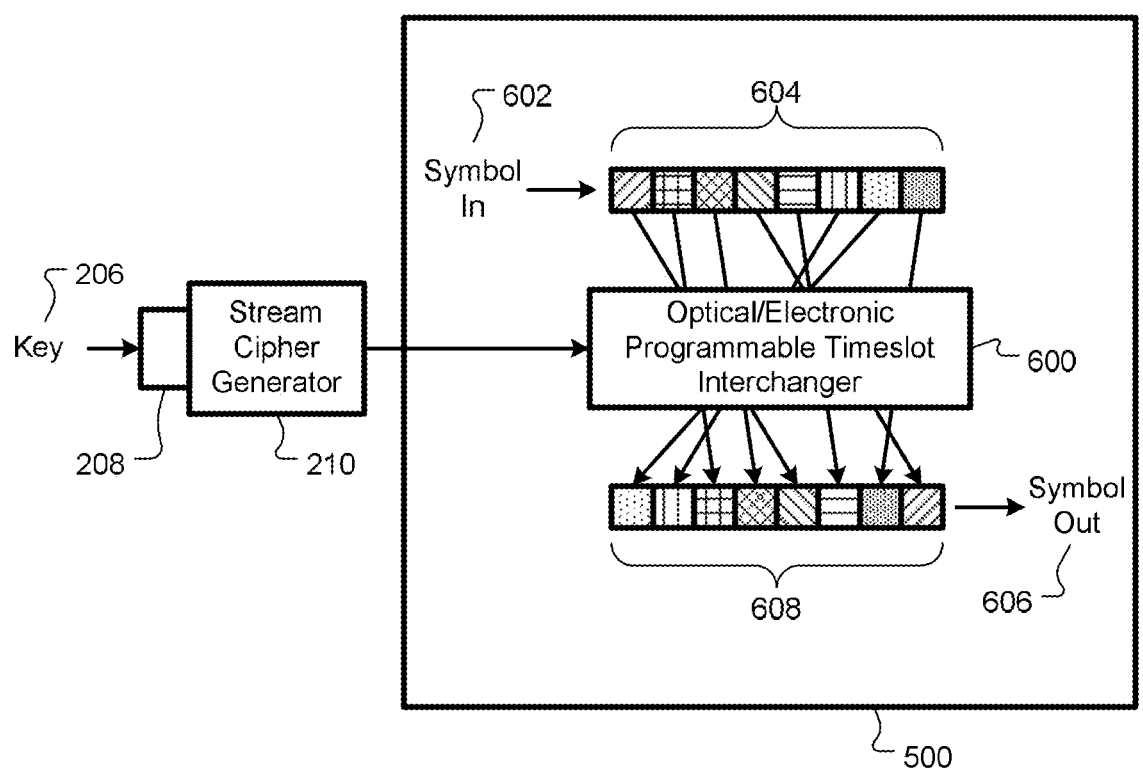
FIG. 6 is a schematic block diagram of a pseudo-random timeslot interleaver of the optical signal encryptor of FIG. 5, according to an embodiment of the present invention.

FIG. 6 is a schematic block diagram of the pseudo-random timeslot interleaver 500, according to an embodiment of the present invention. An optical/electronic programmable timeslot interchanger 600 is programmed to interchange input symbols 602, or portions of the input symbols, such as bits 604 of each input symbol, such as according to a table of permutations, and produce output symbols 606. An exemplary permutation is shown at 608. The optical/electronic programmable timeslot interchanger 600 may, for example, step through the table once for each key generated by the stream cipher generator 210. Alternatively, a table entry may be selected based on the value of the key generated by the stream cipher generator 210, i.e., the key value may be used as an index into the table. Since the stream cipher generator 210 generates a stream of keys, which table entry is used changes frequently. Alternatively, the key values generated by the stream cipher generator 210 may drive combinatorial logic, which performs the interchanges.

As noted, the legitimate receiver 202 preferably operates near its quantum limit of coherent detection to prevent an eavesdropper effectively analyzing the transmitter's 200 broadband modulated optical carrier signal 302 (FIG. 3). However, if the legitimate receiver 202 receives a modulated optical carrier signal 304 that has a higher signal-to-noise ratio than necessary to enable the legitimate receiver 202 to successfully decrypt and demodulate the signal 304, the transmitter 200 may reduce the signal 302 level and/or add noise to the signal 302 the transmitter 200 sends to effectively drive the legitimate receiver 202 arbitrarily close to the quantum limit of coherent detection to deny an eavesdropper receiver 205 (FIG. 2) an optical signal with sufficient signal-to-noise to successfully analyze.

Figure 7:
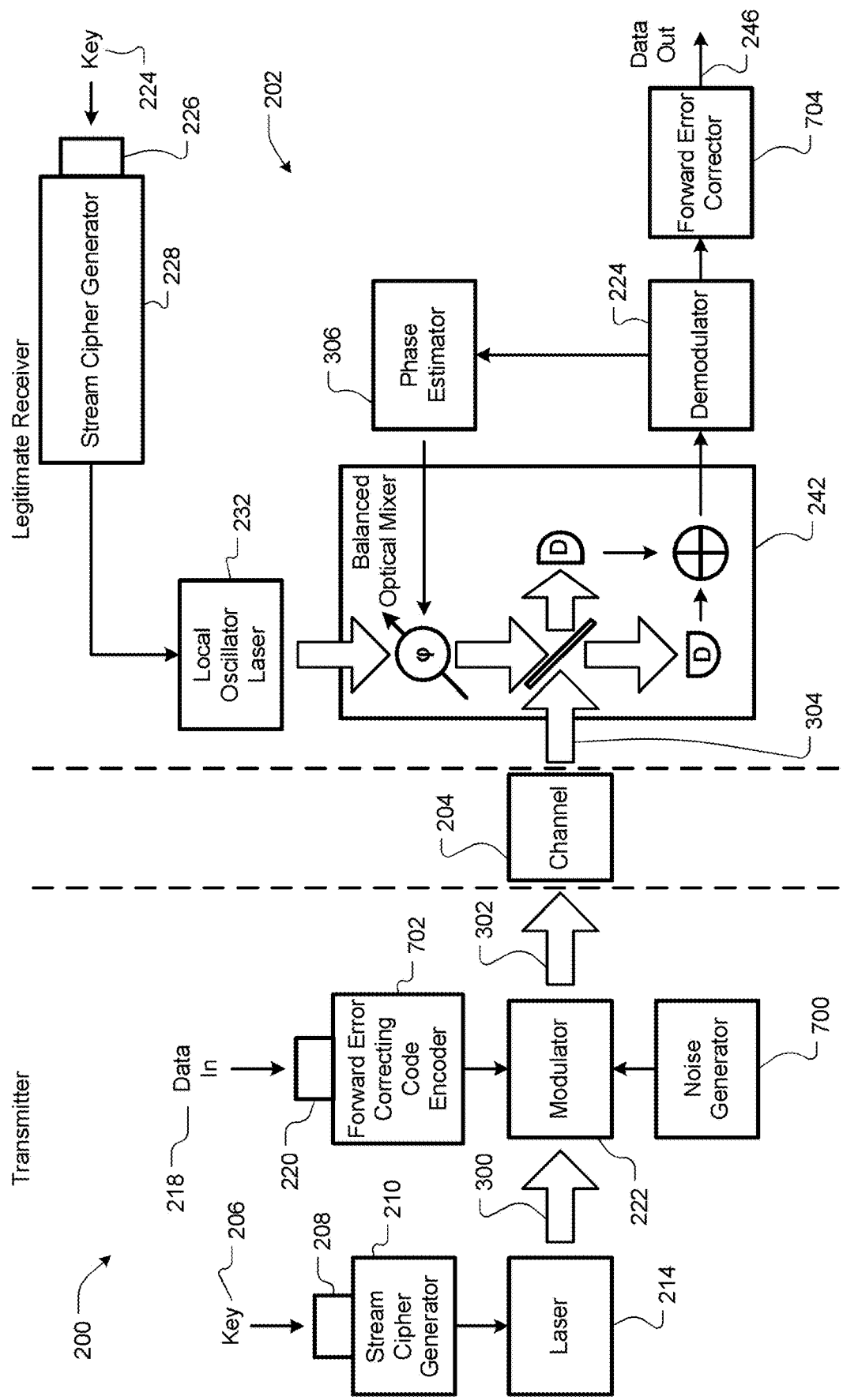

FIG. 7 is a schematic block diagram of the optical signal encryptor (transmitter 200) and the optical signal decryptor (legitimate receiver 202) of FIG. 3, according to other embodiments of the present invention. In the embodiments shown in FIG. 5, the transmitter 202 includes a noise generator 700 and a forward error correcting code encoder 702, and the legitimate receiver 202 includes a forward error corrector 704 to counteract the noise injected into the optical signal transmitted by the transmitter 200.

The legitimate receiver 202 may send a relatively low data rate feedback signal (not shown) to the transmitter 200 to indicate how close to its capacity the forward error corrector 704 is operating. To achieve maximum security, the forward error corrector 704 should operate so as to barely correct the errors. If the forward error corrector 704 is unable to correct the errors, the noise generator 700 decreases the amount of noise the noise generator 700 introduces into the transmitter's 200 transmitted optical signal. On the other hand, if the forward error corrector 704 is easily able to correct the errors, the noise generator 700 increases the amount of noise the noise generator 700 introduces into the transmitter's 200 transmitted optical signal. Alternatively the transmitter 20 may increase the transmitted power level until the receiver can barely demodulate at or near the quantum limit.

In electrical engineering, computer science and information theory, channel capacity is the tight upper bound on the rate at which information can be reliably transmitted over a communications channel. By the noisy-channel coding theorem, the channel capacity of a given channel is the limiting information rate, in units of information per unit time, that can be achieved with arbitrarily small error probability. Information theory, developed by Claude E. Shannon, defines the notion of channel capacity and provides a mathematical model by which one can compute it. Information theory states that the capacity of the channel, as defined above, is given by the maximum of the mutual information between the input and output of the channel, where the maximization is with respect to the input distribution.

The communication system, i.e., the transmitter 200, the channel 204 and the legitimate receiver 202, can be modeled as a white Gaussian noise channel. The communication system should be biased just shy of the Shannon capacity C, such as by adjusting the transmitter's 200 laser 214 signal strength and/or by introducing noise with the noise generator 700. As a result, for a transmission rate R, C-R~$\epsilon$, for a small number $\epsilon$>0. Here $\epsilon$ can be arbitrarily small and, for example, can be adjusted so R is within 0.01% of C. The forward error correcting code used should perform very close to capacity. An exemplary forward error correcting code is a long block-length low density parity check code. R is fixed, and C is manipulated by the insertion of the errors by the noise generator 700 to maintain C-R~$\epsilon$, and/or by reducing the transmitted signal strength, as commanded by the feedback loop.

In embodiments described with respect to FIGS. 2-4 and 7, the band-spread W is much greater than R. The ratio W/R should be large enough such that classical crypto-analysis is very difficult or impossible.

In general, an optical signal can be band-spread across a larger bandwidth than a broadband optical detector can detect. Therefore, the transmitter 200 can generate an optical carrier 216 that is broader in bandwidth than the eavesdropper receiver 205 can detect with a single detector. Similarly, the legitimate receiver 202 can generate a band-spread optical signal 238 that is as broad as the transmitter's carrier 216, and broader than the eavesdropper receiver 205 can detect with a single detector.

Hypothetical Eavesdropper Receiver

Figure 8:
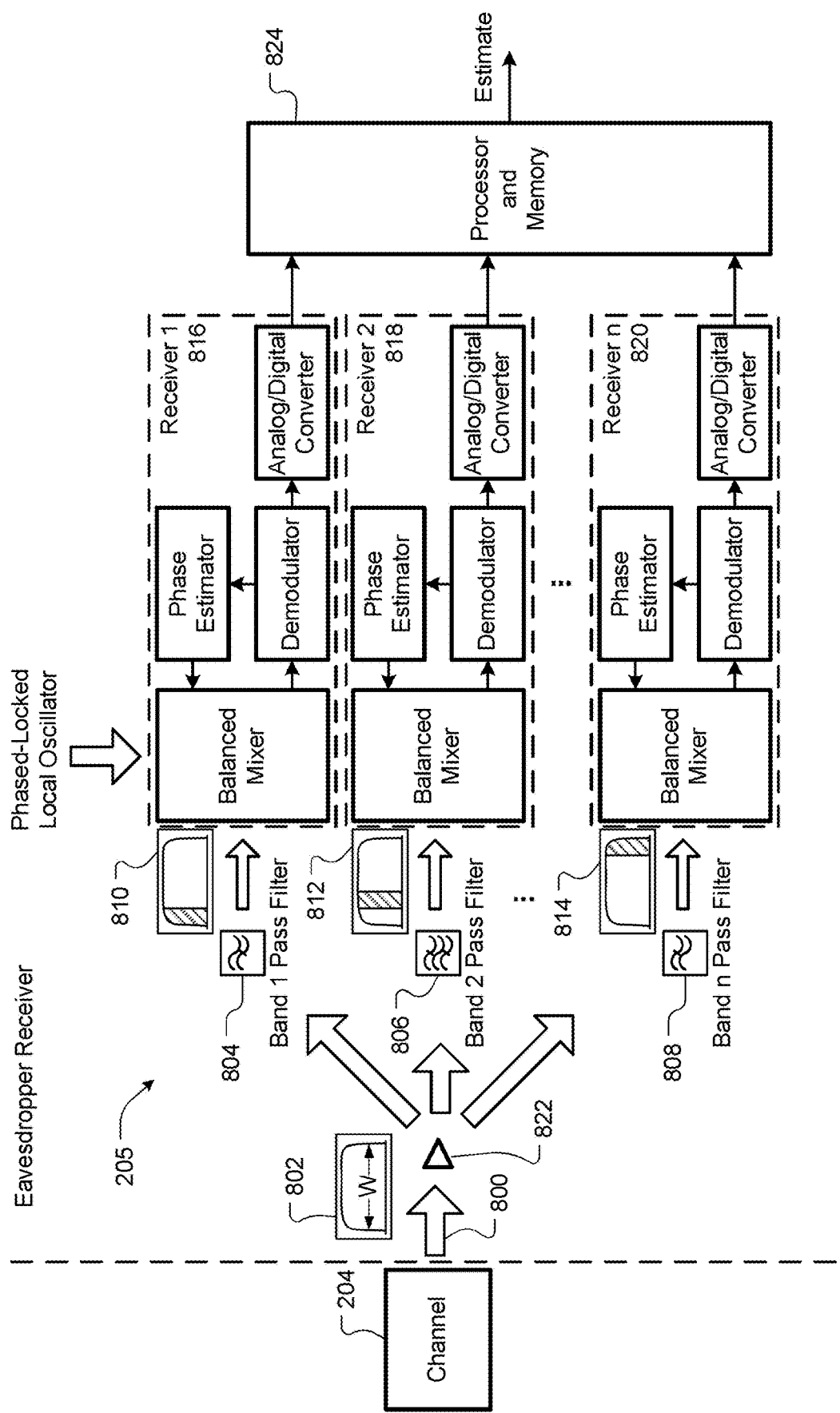
FIG. 8 is a schematic block diagram of a hypothetical eavesdropper receiver that might be used to attempt to decrypt messages sent by the optical signal encryptors of FIGS. 3-5 and 7.

An eavesdropper may attempt to compensate for the inability to demodulate the entire broadband modulated optical carrier by splitting the eavesdropped optical signal into several relatively narrow bands and detecting each of these bands separately in parallel, as schematically illustrated in FIG. 8. The eavesdropped optical signal 800 has a relatively wide bandwidth W, as represented by a bandwidth graph 802. The eavesdropper receiver 205 splits the eavesdropped optical signal 800 with a set of parallel optical filters, represented by optical filters 804, 806 and 808, into a set of wavelength-adjacent optical bands, as indicated by bandwidth graphs 810, 812 and 814.

Shaded portions in the bandwidth graphs 810-814 indicate portions of the bandwidth W that are passed by the respective optical filters 804-808 to respective receivers, represented by receivers 816, 818 and 820. The eavesdropper receiver 205 needs an optical amplifier 822 to provide sufficient optical signal strength to the respective receivers 816-820. A processor 824 analyzes outputs from the receivers 816-820 and attempts to recover the messages sent by the transmitter 200 (FIG. 2). However, optical detectors in each of the receivers 816-820 introduces quantum noise, and the optical signal 800 has insufficient signal-to-noise (S/N) ratio to permit any useful determination of messages in the signal 800.

Security Performance Analysis

In a quantum mechanical formulation, heterodyne detection is equivalent to the measurement of the non-self-adjoint annihilation operator $\alpha$ of the received optical field, and homodyne detection is equivalent to the measurement of the operator $(\alpha+\alpha^+)/2$ [1]. The manifestation of quantum measurement noise is an additive white Gaussian noise of spectral density $N_0/2 = h\upsilon/2\eta$ for heterodyne detection and $N_0/2 = h\upsilon/4\eta$ for homodyne detection, where $\eta$ is the quantum efficiency of the detector. If the bandwidth of the spread signal is less than or equal to the detector bandwidth, the eavesdropper should use homodyne detection. For signals with low noise powers, homodyne detection is a better detection scheme, by a factor of two, than heterodyne detection.

If the band-spread is beyond the detector bandwidth, an optical amplifier can be used to set the detection signal-to-noise ratio, sacrificing an excess noise factor of two, since the quantum mechanical model of the ideal optical amplifier is the annihilation operator $\alpha$, which is the equivalent of heterodyne detection, as shown in FIG. 8. The alternative of slicing the optical spectrum into detectable chunks, followed by homodyne detection, is feasible ideally, but extremely difficult to implement without substantial attenuation loss and difficulties in subsequent digital signal processing, mostly due to the quantum noise at each receiver and the significant amount of sampled data generated without the benefit of the dispreading key.

The capacity of the user channel in terms of bits per use per dimension of the discrete channel is given by equation (1).

$$C = \frac{1}{2}\log_2\left(1 + \frac{2E_s}{N_0}\right) = \frac{1}{2}\log_2(1 + SNR), \quad SNR \equiv \frac{2E_s}{N_0} \quad (1)$$

where $E_s$, is the received energy per symbol and the artificial errors inserted at the transmitter is such that $C-R\sim\epsilon$, for some small number $\epsilon$. The bandwidth expansion from B to W via direct laser modulation or by a modulator integrated with the laser 214 or 232, as described with respect to FIG. 3, or by a modulator external of the laser 214 or 232, as described with respect to FIG. 4, forces the eavesdropper to try to detect the raw encoded bits at the expanded bandwidth of W with an effective eavesdropper signal to noise ratio of SER=SNR.B/W<SNR. The eavesdropper's capacity, or maximum mutual information with the data source, is given by equation (2).

$$C_e = \frac{1}{2}\log(1 + SER) < C = \frac{1}{2}\log(1 + SNR) \quad (2)$$

While we cannot ensure that the eavesdropper will not receive any power, we can decrease the eavesdropper's signal-to-noise ratio by forcing the eavesdropper to detect a much wider band of noise to capture the signal. If $C_e<R\ll C$, the negative statement of the Shannon coding theorem says that the eavesdropper cannot decode with any accuracy, with decoding error probability for long sequences approaching one. A stronger statement of secrecy can be found in Shannon's work in 1946, declassified and published in 1949 [2]. A more ready-to-use form is found in [3], and the secrecy capacity achievable is given by equation (3).

$$C_s = \left\{\frac{1}{2}\log(1 + SNR) - \frac{1}{2}\log(1 + SER)\right\}^+ = \quad (3)$$
$$\left\{\frac{1}{2}\log\left(1 + \frac{2E_s}{N_0}\right) - \frac{1}{2}\log\left(1 + \frac{2BE_s}{WN_0}\right)\right\}^+ \sim$$
$$\left\{\frac{1}{2}\log\left(1 + \frac{2E_s}{N_0}\right) - \frac{BE_s}{WN_0}\right\}^+ =$$

$$\frac{1}{2}\{\log(1 + SNR) - SER\}, \text{ for } SER \ll 1.$$

Figure 9:
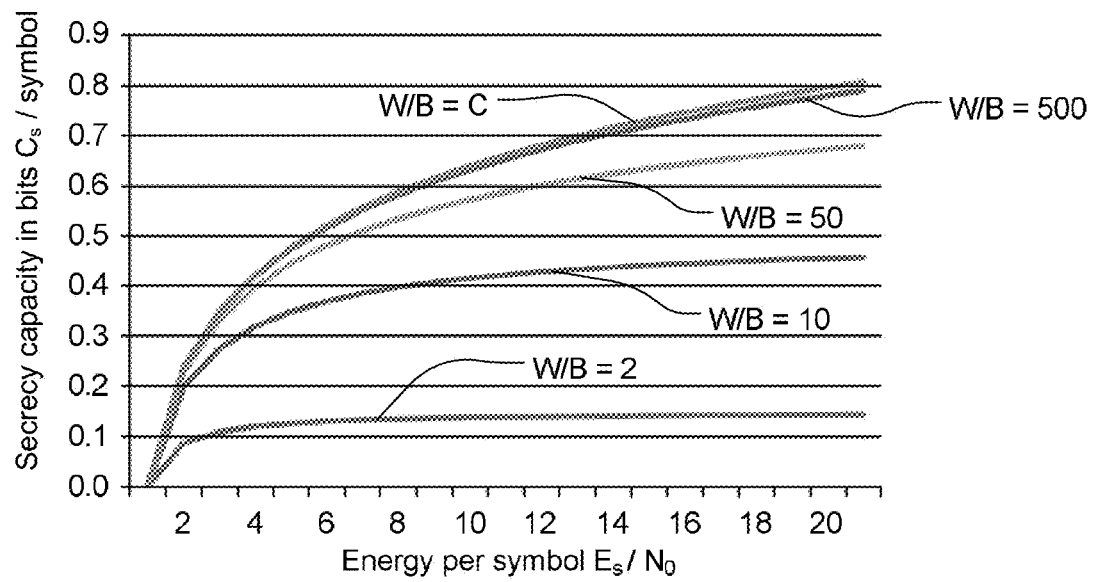
FIG. 9 is a graph showing achievable information theoretic secrecy capacity vs energy per symbol for a ratio of band spread over signaling bandwidth W/B=2, 10, 50 and 500, according to the prior art.

In the limit of large bandwidth expansion, W/B≫1, the secrecy capacity approaches that of the user channel capacity C see FIG. 9. However, in most fiber networks the situation can be much more complicated than what is given by the above equation. If the link goes through optical amplifiers, the noise accumulation from spontaneous emissions of the amplifiers must be added into the calculation of single mode noise variance, $N_0'/2$. Thus, the legitimate receiver 202 can be well down-stream of the transmitter 100, receiving the signal with much accumulated noise, whereas an eavesdropper 205 upstream of the legitimate receiver 202 can have essentially a quantum limited receiver with no additive noise.

The difference in noise levels can be very large and is related to the parameter "head-room," which is the signal margin at the transmitter 200, over what is barely detectable by the best receiver. This ratio is typically 20 dB and can be as high as 30 dB. The upper limit is capped by non-linear effects in optical fiber. Thus, for non-zero secrecy capacity, the band-spreading should be larger than the head-room. The gain W/B in FIG. 9 must be modified as $(W/B).(N_0/N_0')$. FIG. 9 is a graph showing achievable information theoretic secrecy capacity vs energy per symbol for a ratio of band spread over signaling bandwidth (W/B) of 2, 10, 50 and 500. See Claude E. Shannon, "Communication Theory of Secrecy Systems," Bell System Technical Journal, vol. 28(4), page 656-715, 1949, (declassified 1946).

Thus, communication cryptographic schemes, as described herein, have provable security. These schemes force an eavesdropper, without the spreading key 206, to detect a much larger bandwidth of noise, with power at least as large as the irreducible quantum detection noise. The differential signal-to-noise ratios between the user and the eavesdropper yield a Shannon secrecy capacity that can be made arbitrarily close to the capacity of the channel 204 by letting W/B→∞, although in real life implementations, equation (3) guarantees information theoretic secrecy capacity with finite W/R and appropriate coding. Moreover, the substantial experimental difficulties of realizing the eavesdropper receiver 205 shown in FIG. 8 provide considerable additional security.

Methods

Figure 10:
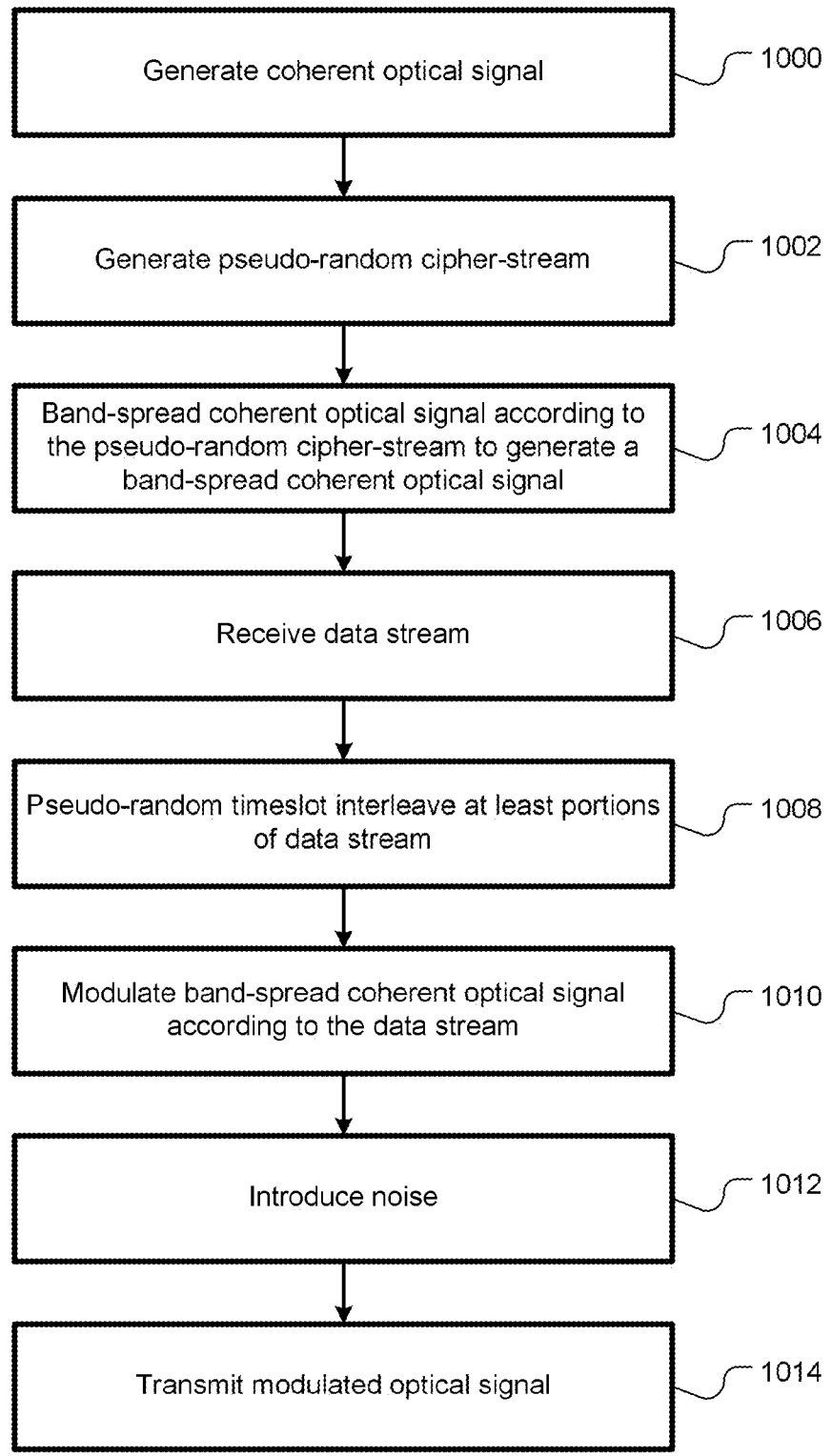
FIG. 10 is a flowchart schematically illustrating a method for encrypting an optical signal, according to embodiments of the present invention.

FIG. 10 is a flowchart schematically illustrating a method for encrypting an optical signal. At 1000, a coherent optical signal is generated, such as by the laser 214 (FIG. 2). At 1002, a pseudo-random cipher-stream is generated according to an encryption key, such as by the stream cipher generator 210. At 1004, the coherent optical signal is band-spread according to the pseudo-random cipher-stream, to generate a band-spread coherent optical signal, such as by phase modulating or frequency modulating the coherent optical signal from the laser 214 according to the keys in the pseudo-random cipher-stream.

At 1006, a data stream is received, such as via the port 220. Optionally, at 1008, at least portions of the data stream are pseudo-random timeslot interleaved, such as by the interleaver 500 (FIG. 5), thereby producing a timeslot interleaved data stream. At 1010, the band-spread coherent optical signal is modulated according to the data stream to generate a modulated optical signal, such as by the modulator 222. If at least a portion of the data stream was interleaved at 1008, modulating the band-spreading coherent optical signal includes modulating the band-spreading coherent optical signal according to the timeslot interleaved data stream.

Optionally, at 1012, noise (errors) are deliberately introduced in the modulated optical signal. At 1014, the modulated optical signal is transmitted, such as into the channel 204.

Figure 11:
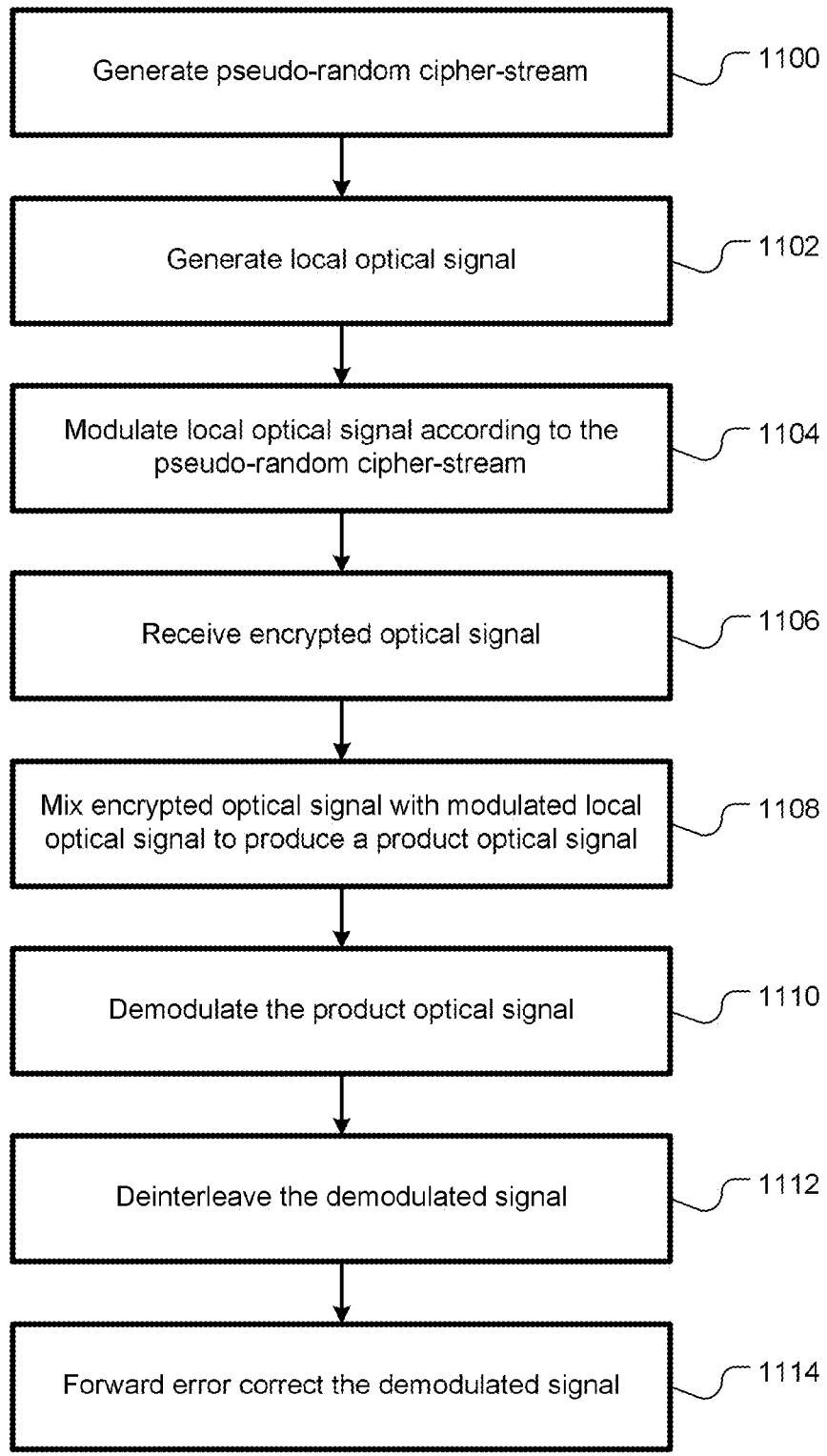
FIG. 11 is a flowchart schematically illustrating a method for decrypting an encrypted optical signal, according to embodiments of the present invention.

FIG. 11 is a flowchart schematically illustrating a method for decrypting an encrypted optical signal. At 1100, a pseudo-random cipher-stream is generated according to an encryption key, such as by the stream cipher generator 228. At 1102, a local optical signal is generated, such as by the local oscillator laser 232. At 1104, the local optical signal is modulated according to the pseudo-random cipher-stream, such as by phase modulating or frequency modulating the coherent optical signal from the laser 232 according to the keys in the pseudo-random cipher-stream.

At 1106, the encrypted optical signal is received, such as via the port 240 (FIG. 2). At 1108, the encrypted optical signal and the modulated local optical signal are mixed, such as by the balanced optical mixer 242, to produce a product optical signal. At 1010, the product optical signal is demodulated, such as by the demodulator 224 to produce a demodulated signal. Optionally, at 1112, the demodulated signal is deinterleaved, such as by the deinterleaver 502 (FIG. 5). Optionally, at 1114, the demodulated signal is forward error corrected, such as by the forward error corrector 704 (FIG. 7).

While specific parameter values may be recited for disclosed embodiments, within the scope of the invention, the values of all of parameters may vary over wide ranges to suit different applications. Although embodiments have been described that phase or frequency modulate the optical signals from the lasers 214 and 232, other forms of modulation may be used, such as amplitude modulation or polarization modulation.

While the invention is described through the above-described exemplary embodiments, modifications to, and variations of, the illustrated embodiments may be made without departing from the inventive concepts disclosed herein. For example, transmitters 200 and legitimate receivers 202 may use different schemes, as discussed with respect to FIGS. 3 and 4, to modulate their respective lasers 214 and 232 to generate the band-spread optical carrier signal. Any embodiment may optionally include the interleaving and/or the noise injection described with respect to FIGS. 5-7. Furthermore, disclosed aspects, or portions thereof, may be combined in ways not listed above and/or not explicitly claimed. Embodiments disclosed herein may be suitably practiced, absent any element that is not specifically disclosed herein. Accordingly, the invention should not be viewed as being limited to the disclosed embodiments.

Although aspects of embodiments may be described with reference to flowcharts and/or block diagrams, functions, operations, decisions, etc. of all or a portion of each block, or a combination of blocks, may be combined, separated into separate operations or performed in other orders. All or a portion of each block, or a combination of blocks, or other aspects of the disclosed invention or embodiments thereof may be implemented by photonic components, as computer program instructions (such as software), hardware (such as electronic components, combinatorial logic, Application Specific Integrated Circuits (ASICs), Field-Programmable Gate Arrays (FPGAs) or other hardware), firmware or combinations thereof. Embodiments may be implemented by a processor executing, or controlled by, instructions stored in a memory. The memory may be random access memory (RAM), read-only memory (ROM), flash memory or any other memory, or combination thereof, suitable for storing control software or other instructions and data. Instructions defining the functions of the present invention may be delivered to a processor in many forms, including, but not limited to, information permanently stored on tangible non-writable storage media (e.g., read-only memory devices within a computer, such as ROM, or devices readable by a computer I/O attachment, such as CD-ROM or DVD disks), information alterably stored on tangible writable storage media (e.g., floppy disks, removable flash memory and hard drives) or information conveyed to a computer through a communication medium, including wired or wireless computer networks.

REFERENCES

[1] H. P. Yuen and V. W. S. Chan, "Noise in Homodyne and Heterodyne Detection," Optics Letters, vol. 8, no. 3, pp. 177-179, March 1983.

[2] Claude E. Shannon, "Communication Theory of Secrecy Systems," Bell System Technical Journal, vol. 28(4), pp. 656-715, 1949, (declassified 1946).

[3] Andrew Puryear, Vincent W. S. Chan, "Using Spatial Diversity to Improve the Confidentiality of Atmospheric Free Space Optical Communication," IEEE Globecom, December 2011, Houston, Tex.

What is claimed is:

1. An optical signal encryptor, comprising:
a first input port configured to receive an encryption key signal;
a pseudo-random cipher-stream generator that generates a pseudo-random cipher-stream according to the encryption key signal;
a laser whose optical output is band-spread according to the pseudo-random cipher-stream to produce a band-spread optical signal;
a second input port configured to receive a data stream; and
a modulator that modulates the band-spread optical signal according to the data stream.

2. An optical signal encryptor according to claim 1, wherein the modulator is integrated with the laser.

3. An optical signal encryptor according to claim 1, wherein the laser is directly modulated to cause the band-spread.

4. An optical signal encryptor according to claim 1, wherein the laser is directly modulated by varying bias current to the laser.

5. An optical signal encryptor according to claim 1, wherein the laser is directly modulated by varying temperature of the laser.

6. An optical signal encryptor according to claim 1, wherein the modulator comprises an electro-optical modulator.

7. An optical signal encryptor according to claim 1, wherein the modulator comprises an electro-absorption modulator.

8. An optical signal encryptor according to claim 1, wherein the laser optical output is band-spread at least 50 GHz.

9. An optical signal encryptor according to claim 1, wherein the laser optical output is band-spread at least 1 THz.

10. An optical signal encryptor according to claim 1, further comprising a pseudo-random timeslot interleaver disposed between the second input port and the modulator, the timeslot interleaver interleaving at least portions of the data stream and providing a timeslot interleaved data stream to the modulator.

11. An optical signal encryptor according to claim 1, wherein the modulator produces a modulated band-spread optical signal, the optical signal encryptor further comprising a noise generator coupled to introduce errors in the modulated band-spread optical signal.

12. An optical signal decryptor, comprising:
a first input port that receives an encryption key signal;
a pseudo-random cipher-stream generator that generates a pseudo-random cipher-stream according to the encryption key signal;
a local optical oscillator modulated by the pseudo-random cipher-stream;
a second input port that receives an encrypted optical signal;
an optical balanced mixer having one input coupled to the local optical oscillator and another input coupled to the second input port; and
a demodulator coupled to an output of the optical balanced mixer.

13. An optical signal decryptor according to claim 12, further comprising a deinterleaver decoder coupled to an output of the demodulator.

14. An optical signal decryptor according to claim 12, further comprising a forward error corrector coupled to an output of the demodulator.

15. An optical signal decryptor according to claim 12, wherein the demodulator operates within 0.1 dB of a quantum limit of coherent detection of the demodulator.

16. An optical signal decryptor according to claim 12, wherein the demodulator operates within 1 dB of a quantum limit of coherent detection of the demodulator.

17. An optical signal decryptor according to claim 12, wherein the demodulator operates within 3 dB of a quantum limit of coherent detection of the demodulator.

18. A method for encrypting an optical signal, the method comprising:
generating a coherent optical signal;
generating a pseudo-random cipher-stream according to an encryption key;
band-spreading the coherent optical signal according to the pseudo-random cipher-stream to generate a band-spread coherent optical signal;
receiving a data stream;
modulating the band-spread coherent optical signal according to the data stream to generate a modulated optical signal; and
transmitting the modulated optical signal.

19. A method according to claim 18, further comprising pseudo-random timeslot interleaving at least portions of the data stream, thereby producing a timeslot interleaved data stream, wherein modulating the band-spreading coherent optical signal comprises modulating the band-spreading coherent optical signal according to the timeslot interleaved data stream.

20. A method according to claim 18, further comprising deliberately introducing errors in the modulated optical signal.

21. A method for decrypting an encrypted optical signal, the method comprising:
generating a pseudo-random cipher-stream according to an encryption key;
generating a local optical signal;
modulating the local optical signal according to the pseudo-random cipher-stream;
receiving an encrypted optical signal;
mixing the encrypted optical signal and the modulated local optical signal to produce a product optical signal;
demodulating the product optical signal, thereby producing a demodulated signal.

22. A method according to claim 21, further comprising deinterleaving the demodulated signal.

23. A method according to claim 21, further comprising forward error correcting the demodulated signal.

* * * * *